(12) United States Patent  
Shreider et al.

(10) Patent No.: US 8,310,078 B2  
(45) Date of Patent: Nov. 13, 2012

(54) APPARATUS FOR RECEIVING AND TRANSFERRING KINETIC ENERGY FROM WATER FLOW

(76) Inventors: Vladimir Anatol Shreider, Sydney (AU); Natalia Shreider, Sydney (AU)

( * ) Notice: Subject to any disclaimer, the term of this patent is extended or adjusted under 35 U.S.C. 154(b) by 348 days.

(21) Appl. No.: 12/799,797

(22) Filed: May 3, 2010

(65) Prior Publication Data

US 2010/0221106 A1  Sep. 2, 2010

Related U.S. Application Data

(63) Continuation-in-part of application No. 12/001,943, filed on Dec. 14, 2007, now Pat. No. 7,928,594.

(51) Int. Cl.
 *F03B 13/00* (2006.01)
 *H02P 9/04* (2006.01)
 *F03B 13/12* (2006.01)
 *F03B 13/10* (2006.01)

(52) U.S. Cl. ............... 290/54; 290/42; 290/53; 415/3.1; 415/7

(58) Field of Classification Search .............. 290/42, 290/53, 54; 415/3.1, 7
See application file for complete search history.

(56) References Cited

U.S. PATENT DOCUMENTS

| | | | | |
|---|---|---|---|---|
| 4,517 A | * | 5/1846 | Hand | 416/86 |
| 98,891 A | * | 1/1870 | Sory | 416/119 |
| 113,284 A | * | 4/1871 | Folsom | 416/119 |
| 302,769 A | * | 7/1884 | Pallausoh | 416/119 |
| 1,265,114 A | * | 5/1918 | Riddle | 416/112 |
| 1,371,204 A | * | 3/1921 | Holt | 416/118 |
| 1,649,644 A | * | 11/1927 | Alexeeff | 415/141 |
| 3,928,771 A | * | 12/1975 | Straumsnes | 290/43 |
| 4,047,833 A | * | 9/1977 | Decker | 415/4.4 |
| 4,048,947 A | * | 9/1977 | Sicard | 440/8 |
| 4,104,536 A | * | 8/1978 | Gutsfeld | 290/54 |
| 4,203,707 A | * | 5/1980 | Stepp | 416/119 |
| 4,253,795 A | * | 3/1981 | McQueen | 415/125 |
| 4,424,451 A | * | 1/1984 | Schmidt | 290/54 |
| 4,776,762 A | * | 10/1988 | Blowers, Sr. | 416/119 |
| 5,051,059 A | * | 9/1991 | Rademacher | 415/7 |
| 5,098,264 A | * | 3/1992 | Lew | 418/23 |
| 6,006,518 A | * | 12/1999 | Geary | 60/398 |
| 6,069,409 A | * | 5/2000 | Fowler et al. | 290/55 |
| 6,499,939 B2 | * | 12/2002 | Downing | 415/3.1 |
| 6,537,018 B2 | * | 3/2003 | Streetman | 415/3.1 |
| 7,591,635 B2 | * | 9/2009 | Ryu et al. | 416/111 |
| 7,855,468 B2 | * | 12/2010 | Lin | 290/54 |
| 8,076,791 B2 | * | 12/2011 | Hostetler | 290/54 |
| 8,120,196 B1 | * | 2/2012 | Neese | 290/54 |
| 2002/0187038 A1 | * | 12/2002 | Streetman | 415/3.1 |
| 2005/0082838 A1 | * | 4/2005 | Collins | 290/55 |
| 2008/0309089 A1 | * | 12/2008 | Lin | 290/54 |
| 2010/0060008 A1 | * | 3/2010 | Hostetler | 290/54 |
| 2010/0308583 A1 | * | 12/2010 | Shreider et al. | 290/42 |
| 2012/0211992 A1 | * | 8/2012 | Boone | 290/55 |

* cited by examiner

*Primary Examiner* — Pedro J Cuevas

(57) ABSTRACT

A tangential turbine is adapted for receiving kinetic energy from a flowing fluid and comprises a supporting shroud, a rotating runner having a hub and a plurality of radial blades spaced apart on the hub, and a means for controlling the receiving. In first embodiment the controlling means comprises a plurality of springs each connected with its ends turningly about a connecting axis being between and within the hub and the blade and between limit stops to the hub and fixedly to the blade turnable about the axis to a non-working tangential position. In second embodiment the controlling means comprises the shroud shaped into a caisson and provided with turnable aprons and capable of accommodating the runner in the air and controlling the insertion of the blades into the flow below the shroud.

11 Claims, 2 Drawing Sheets

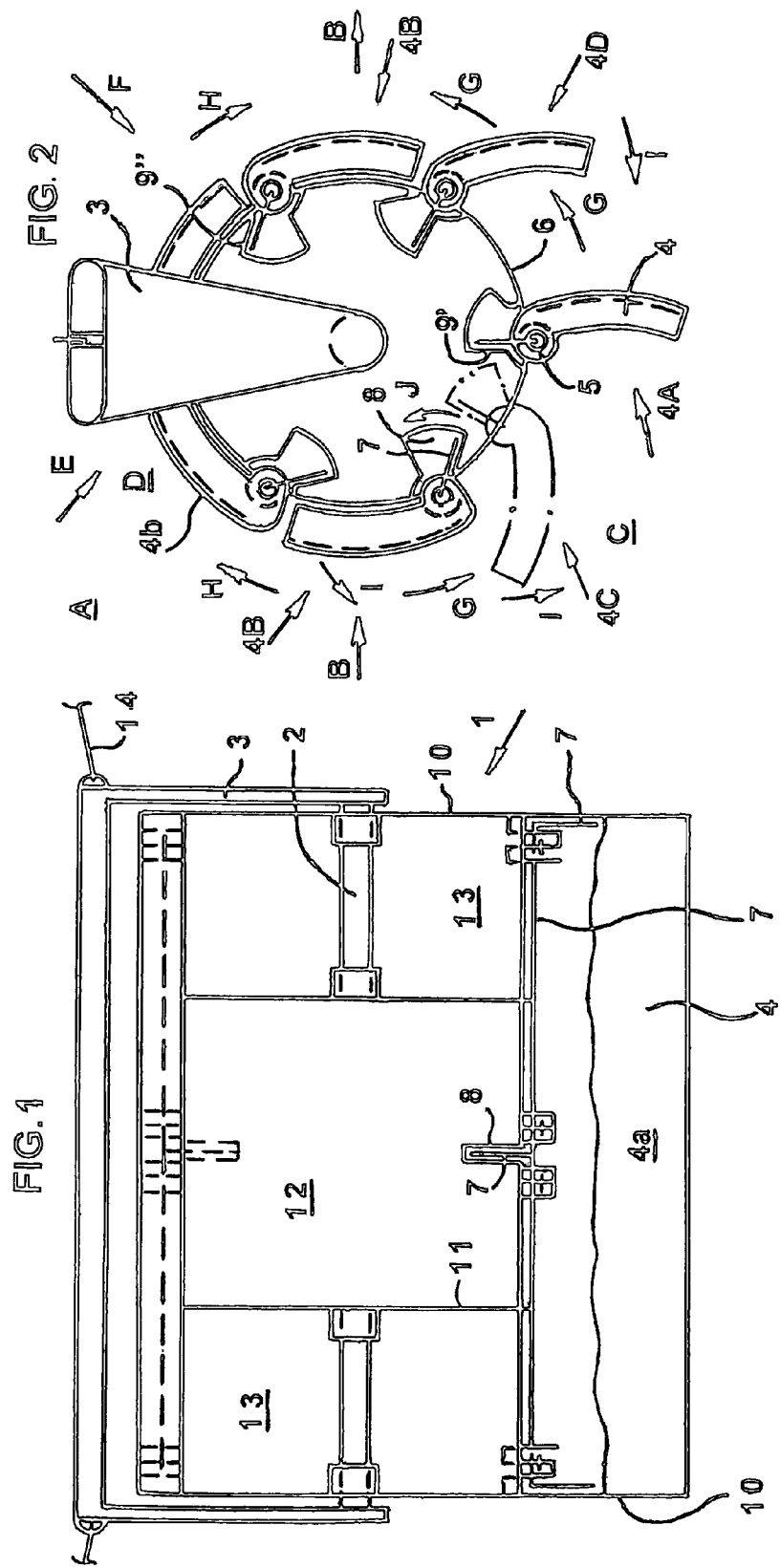

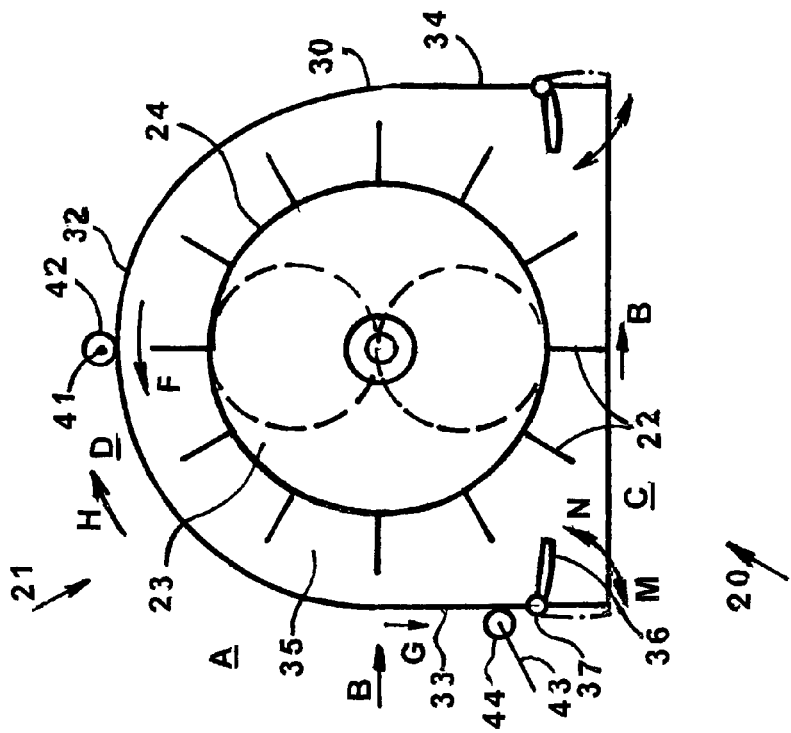
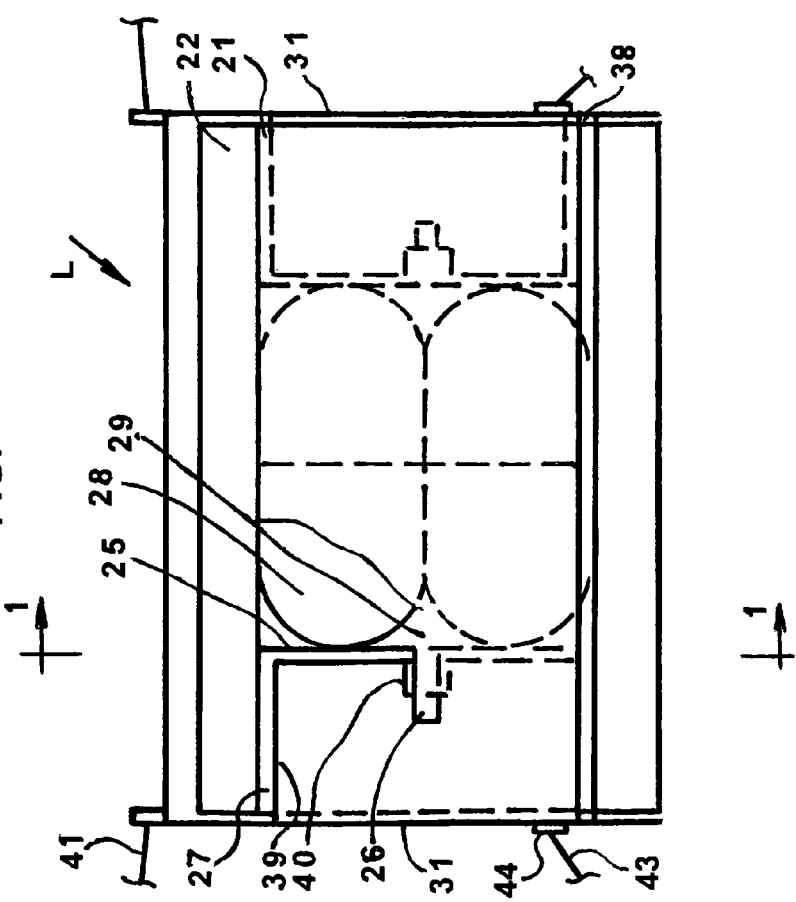

APPARATUS FOR RECEIVING AND TRANSFERRING KINETIC ENERGY FROM WATER FLOW

CROSS-REFERENCE TO RELATED APPLICATIONS

This application is a continued-in-part application/Control Number Ser. No. 12/001,943, Art Unit 2839, filed Dec. 14, 2007 now U.S. Pat. No. 7,928,594 and non-elected and withdrawn from consideration pursuant to 37 CFR 1.142 (b)

STATEMENT REGARDING FEDERAL SPONSORED R and D

Not Applicable

REFERENCE TO A MICROFICHE APPENDIX

Not applicable

BACKGROUND OF THE INVENTION

The invention relates to apparatuses for receiving and transferring kinetic energy of a fluid basin, especially a water basin into any usable power and especially to submersible tangential fluid and hydro-turbines as defined in claim 1.

There exists a need for effective, high-speed hydro-turbines which do not require substantial vehicular support for deployment or retrieval and can be placed in a particular optimal operative position in a path of a water flow, then easily manoeuvred to a different position within the flow in the event of a change of location of the optimal path and stabilised in the path without complex anchoring means.

Here is suggested as the nearest a well-known tangential fluid turbine which is suffered from resistance of an oncoming flow against rotation of turbine blades in a counter direction.

For claims 1 and 2 here is considered as the nearest a tangential turbine from E.U. Patent Application PCT No. WO 9961791 filed 1999 Dec. 2 that is provided with blades turnable by the flow through 180° between positions across and along the flow and has the disadvantage such as needing of a damping means for absorbing shock energy of the blades.

The invention is intended to eliminate the prior art inconveniences and is directed to new and useful developments and alternatives to the prior art.

SUMMARY OF THE INVENTION

Embodiments of the apparatus according to the present invention follow utilising a tangential fluid turbine having a runner with a plurality of adjacent radial blades turnable about a longitudinal runner axis of rotation, the axis being horizontal and crossing a direction of the main flow, and supported at their inner edges on a turbine hub provided with a shaft rotatable in one direction about the axis and supported on a turbine shroud. The hub comprises holds for accommodation of energy-generating parts which may be connected individually to the shaft and to the shroud, and closed tanks for controlling buoyancy and balance of the turbine in the main water flow that are adapted to be filled up with a thixotropic ballast and provided with an energised vibrator means.

The general idea of the claimed invention of the turbine is the utilising a means for controlling the receiving and transferring of the kinetic energy in order to increase the turning moment of the shaft.

The first embodiment of the apparatus according to the invention comprises the controlling means of a plurality of elongate springs of the runner, each of the springs is connected at first its end to the hub with the ability to be turned by the blade reciprocally through an intended acute angle about a connecting axis, the connecting axis being parallel to and remote from the rotating axis and within the hub and the blade, between a pair of controlling limit stops of the hub and between the tangential non-working position and a working position, and at second its end to the blade having the ability to turn about the connecting axis between the tangential position and the radial working position at intended speeds, and to transfer the kinetic energy from the blade at the intended working positions to the hub. Each of the springs is shaped into an axially extending torsion rod. The angle must be equal to about 40°-50°.

The general idea of the second embodiment of the apparatus according to the invention that comprises the controlling means shaped into the shroud having:

a roof extending along the length and the width and at above of the runner;

a front wall extending down from the roof at ahead, in relation to the direction of the flow, and along the length of the runner for facing the oncoming flow and having a lower edge for forming a fluid jet under the wall in the direction toward the lowermost blade;

a rear wall extending down from the roof at behind and along the length of the runner and having a lower edge proximate to a point of the fluid jet discharging from the runner;

opposite side walls extending down from the roof between side ends of the front and rear walls at aside of side ends of the runner and having lower edges located on a horizontal plane containing a lower edge of the lowermost blade, where an upper portion of the lowermost blade being on a horizontal plane containing the lower edges of the front and rear walls, and where the roof, front, side and rear walls define an opening from below of an interior room for accommodating the runner;

thereby the blades are capable to rotate between the lower working position located below the room and the upper position located within the room.

The controlling shroud comprises a source of compressed air, pipes and controlling valves for connecting the air source and the interior room of the shroud that being functional to displace the air into and out of the room, whereby a lower surface of compressed air body within the room and lower edges of the side walls located below the hub that define a channel for the speeded, lower ambient water jet to rotate the shaft with the blades and thereby capable of keeping relatively bigger kinetic energy of the lower ambient water jet; an interior room-forming front apron having first and second opposing ends in a close facing relationship to respective inside faces of the side walls and a forward and upward oriented side portion extending between the side walls and being supported for turning about a connecting axis, the connecting axis being within the lower and upper front edges and parallel to the axis of rotation, at the upper edge in a close facing relationship on the lower edge of the front wall and capable of floating on the surface between a backward oriented horizontal position and a downward oriented vertical position; a shroud interior room-forming rear apron having first and second opposing ends in a close facing relationship to respective inside faces of the side walls and a rearward and upward oriented side edge extending between the side walls and being supported at the upper edge in a close facing relationship on the lower edge of the rear wall and capable of floating on the surface and turning about a connecting axis, the connecting axis being within the lower and upper rear edges and parallel to the axis of rotation, between a forward oriented horizontal position and a downward oriented vertical position; a sealing packing means located outside on the ends of the apron for engaging on the inside faces of the side walls to close-off the interior of the room in relation to its exterior and prevent the outflow of air from the room into outside, whereby movement of the air into and out of the room displaces the surface located in the room in a corresponding vertical direction within a radial width of the lowermost blade and turn the aprons follow the surface about their connecting axes, and thereby changes a depth of sinking of the blades into the lower ambient fluid jet and a magnitude of the kinetic energy which being received by the blades from the jet.

The hub according to the invention comprises numbers of holds for accommodation of an energy-converting means, where the energy-converting means comprising energy-generating parts, the generating parts may be connected individually to the shaft and to the shroud, and closed tanks for ballast materials controlling buoyancy and balance of the turbine in the main flow that are adapted to be filled up with ballast sand mixed with a thixotropic material, and an energised vibrator means.

The invention may be understood more readily and various other features of the invention may become more apparent from consideration of the following description.

BRIEF DESCRIPTION OF THE DRAWINGS

FIG. 1 is a front view of a first embodiment of a kinetic fluid flow energy-receiving and transferring tangential fluid turbine unit of the apparatus according to the invention;

FIG. 2 is a side view of the tangential fluid turbine unit shown in FIG. 1;

FIG. 3 is a front view of a second embodiment of a kinetic fluid flow energy-receiving and transferring tangential fluid turbine unit of the apparatus according to the invention;

FIG. 4 is a vertical cross-section view taken on line 7-7 of FIG. 2.

DESCRIPTION OF THE PREFERRED EMBODIMENTS

Referring to the drawings, reference letter A denotes a fluid, preferably water body moving in relation to a ground floor in a main direction shown by an arrow B in FIG. 1, a letter C denotes an oncoming circular lower ambient fluid flow part of the flow B which having conditions sufficient for receiving its kinetic energy by means of an embodiment of the turbine according to the invention, and a letter D denotes an oncoming circular upper ambient fluid flow part of the flow B which having conditions making difficult the receiving.

The first embodiment of the turbine E as illustrated in FIGS. 1 and 2 is adapted to submerge and capable of being maintained in a path of the main flow A preferably water flowing in the direction B and comprises a relatively widened turbine runner F capable of facing, directing and speeding the flow C in a direction shown by an arrow G in FIG. 2 and having a runner hub 1 for supporting components of the runner F that is capable of rotating about a generally horizontal central axis of opposite axles 2 of a turbine frame shroud 3 capturing the runner F, the axis being disposed in general crossing alignment with the path of the flow A, and at least 3, preferably 6 axially extending, elongate, flow kinetic energy-receiving paddle or wing blades 4 distributed around and individually and turnably connected as at 5 by means of a plurality of bearing lugs and brackets or a piano bearing hinge connections and the like and pins that formed on the hub 1 remotely from the axis. The hinges 5 permit the blades 4 to turn alternately inward and outward, in relation to the hub 1 and about a generally horizontal connecting hinge axis, the hinge axis being within the hub 1 and the blade 4 and coplanar with the axis of rotation, from an operative radially projected position shown by an arrow 4A in FIG. 2 for facing with a frontal inner facial portion 4a shown in FIG. 1 the flow C which being diverged by the hub 1 from the direction B toward under the hub 1 and flows in the direction G into an inoperative closed tangential position shown by an arrow 4B in FIG. 2. A back outer circular cylindrical facial portion 4b of the blade 4 is configured to be streamlined when it is in the inoperative position 4B. The blades 4 may be rectangular in shape and provided with stiffening support ribs oriented perpendicular to the turning axis and along the direction G in order to present blade strength, fairness and firmness. Each of the blades 4 is heavier than water and has a center of gravity located generally remotely from the axis of the hinge 5.

In the position 4B the facial portion 4a of the blade 4 being in a close facing relationship to an outer facial portion of a preferably circular cylindrical shell wall 6 of the hub 1. The blades 4 in their positions 4B can thus form with their portions 4b a streamlined surface for guiding an oncoming upper ambient slip fluid flow which being diverged from the direction B toward over the runner F and flows in a direction shown by an arrow H in FIG. 2 and reduce friction resistance of the runner F. In the position 4A each blade 4 can face the flow C in the direction G and thereby acting to transfer the kinetic energy of the flow C to the runner F and urge the runner F to rotate with the blades 4 about the axis of the axles 2.

An energy-transferring controlling spring means such as an elongate, axially extending torsion rod 7 is fixedly connected between the hub 1 and the blade 4. The hub 1 has the number of recessions 8 having limit stops 9' and 9" and capable of permitting turning reciprocation of a middle portion of the rod 7 with the blade 4 about the axis of the hinge 5 between the position 4A and the position 4B. The rod 7 is configured to permit the blade 4 reciprocally turning about the axis of the hinge 5 in the position 4A and between the positions 4A and 4B.

The hub 1 has any appropriate equilateral polygon or circular cross-section about the axis of rotation, opposite end walls 10 and a number of inner walls 11 distributed axially and secured perpendicularly to the axis of rotation and forming a number of closed, co-axial preferably disposed ballast tanks 12 configured between the wall 6 and the adjacent walls 11 to control a buoyancy and a balance of the turbine in the water flow B and provided with inlet and outlet manifolds and valves (not shown).

The walls 6 and 10 are configuring opposite compartments 13 for accommodating a well-known means for conversing kinetic energy of rotation of the runner F into any useable energy. Conversing means can be connected to the hub 1 and the axles 2 for relative movement and interacting to effect generation of the useable energy.

The runner F is secured at the shroud 3 to an elongate tether member 14 and to support objects which and the conversing means and operating of the turbine are described more fully hereinafter.

In operation, the runner F faces the flow A by means of the blades 4 which move down in turn ahead immediately of the hub 1 when are disposed in the inoperative position 4B and exposed the dynamic pressure of the flow A, and separate the flow A into the flow C in the direction G and the flow D in the direction H in FIG. 2. When the center of gravity of the regular front blade 4 in position 4B becomes behind and outside of the axis of the hinge 5, the front blade 4 turns by means of its own weight together with spring 7 about the hinge 5 outward, in relation to the axis of the runner F and the hinge 5 in directions shown by arrows I and J in FIG. 2 toward the limit stop 9' into a first operative position shown by an arrow 4C in FIG. 2 where the blade 4 can face the flow C oncoming in the direction G and urge the runner F to rotate and then further turns about the axis of the hinge 5 by the dynamic pressure of the flow C in the direction G against the resistance of the spring 7 into the lowermost end operative position 4A in FIG. 2 and further urge the runner F to rotate.

In the end operative position 4A the lowermost blade 4 has its front facial portion 4a as shown in FIG. 1 which being farthest away from the axis of rotation and defines the widest fluid reception compartment, and the fastest jet flow C can be received in this widest compartment and the maximal dynamic pressure of the flow C acts most far from the axis of rotation and thus enabling the most efficient transfer of kinetic energy of the lower high speeded jet flow C to the runner F.

As the runner F revolves further in the direction G, the lowermost blade 4A rotates upward and reaches a transient operative position shown by an arrow 4D in FIG. 2 where approaches to a zone of converging of the flows C and D at immediately behind the runner F, where the dynamic pressure of the jet flow on the blade 4 which is in the operative position 4A decreases and vanishes and the deformed spring 7 continues to force the blade 4 to turn against the decreasing dynamic pressure of the flow C into the position 4D and to force the hub 1 to rotate in relation to the blade 4 in the position 4D. Then the flows C and D become to run into the main flow in the direction B and the dynamic pressure of the flow C vanishes and the spring 7 turns the blade 4 from the position 4D in a direction shown by an arrow I in FIG. 2 about the axis of the hinge 5 toward the position 4B and becomes free and then the own weight of the member 4 and resistance of the upper flow turn down the blade 4 and the spring 7 about the axis of the hinge 5 in a direction shown by an arrow K in FIG. 2 further into the position 4B and up to a limit stop 9" so that the flow reception compartment between the hub 1 and the blade 4 vanishes, the facial portion 4b becomes to be oriented along the direction H of the flow D and a little or no retarding moment is created by the flow D about the axis of rotation of the runner F thus enabling a minimum of transfer of water energy of the upper flow to the rotating runner F.

A second embodiment of the invention is a tangential hydro-turbine L for receiving the kinetic energy of the flow A, preferably a river or a sea current in the direction B, that is adapted to submerge in the water flow A and composed of a turbine runner 20 as shown in FIGS. 3 and 4 and a turbine shroud 21 capturing the runner 20. The runner 20 comprises a set or a plurality of parallel and radial blades or paddles 22 generally arranged on a periphery of a runner hub 23 for rotation about a generally horizontal axis of the runner 20, the axis being across the direction B in FIG. 4. The hub 23 extends along the axis and serves to support and guide the blades 22 during their rotation in the direction B and comprises a co-axially disposed, circular cylindrical shell wall 24, circular disk-shaped inner walls 25 and opposite output shafts 26 fixed on the walls 25 in general transversal alignment with the direction B. The walls 24 and 25 define opposite pockets or recesses 27 for accommodating opposite support compartments of the shroud 21 containing a well-known means for conversion of kinetic energy into any useable energy, which are described more fully hereinafter, and a plurality of air compressor cylinders 28 and a closed ballast hold 29 capable to be filled with ballast materials such as sand mixed with a known thixotropic clay mud or puddle and provided with a well-known, remotely controlled vibrator means (not shown).

As shown better in FIG. 4, the shroud 21 is disposed above and around the blades 22 and takes the form of an open-bottom balloon or caisson and serves to hang the turbine L and control and facilitate the rotation of the runner 20 in the flow A. The shroud 21 has a calotte-shaped cross-section and composed of opposite side walls 30 and 31 adjoined between by a roof 32, a front wall 33 for facing the flow A and a rear wall 34. The roof 32 is of semi-circular configuration with an internal radius of curvature approximating to the external radius of curvature of the runner 20. The walls 30 and 31 have their lower edges being on a horizontal plane containing an outer edge of the lowermost blade 22, The walls 33 and 34 have lower edges being on a horizontal plane containing an upper portion of the lowermost blade 22. The walls 31, 33 and 34 configure an interior room 35 of the shroud 21 for accommodation of the runner 20. Opposite ends of the blades 22 are closely positioned against inside faces of the walls 30 and 31, outer edges of the blades 22 are closely positioned against an inside facial surface of the roof 32 such that a minimal clearance between the blades 22 and the shroud 21 is maintained. The distance between the walls 30 and 31 which partly defines the room 35, is somewhat greater than the length of the runner 20.

As shown in FIG. 4, elongate, horizontally extending between the lower portions of the walls 30 and 31, receiving energy-controlling front and rear aprons 36 are supported on the lower edges of the walls 33 and 34 by means of piano lugs and pin hinges 37 to turn about horizontal axes of the hinges 37 in directions shown by arrows M and N in FIG. 4 and are float-able on a surface of the flow C and have their centers of gravity which are located remotely from an axis of the hinge 37. The small end gaps between the ends of the aprons 36 and the walls 30 and 31 are sealed with a resilient packing 38 provided on the outer ends of the aprons 36 and which engage on the inner surfaces of the walls 30 and 31.

Support compartments 39 are provided on inside facial surfaces of the walls 30 and 31 for accommodating a well-known means for conversion of the kinetic energy of the shafts 26 when being rotated into any usable energy. The entire runner 20 is in contact and supported by the shroud 21 with a well-known, appropriate bearing means 40 supporting the shafts 26 for relative rotation.

A connecting means for the turbine L when which being heavier-than-water that comprises a plurality of length of tethers 41 such as chain or rope which extending horizontally and oppositely from axially spaced ring-bolts 42 secured on a top of the roof 32. A connecting means for the turbine L when which being lighter-than-water that comprises a plurality, two for example, spaced length of anchor chain tethers 43 each having an upper tether end attached to a ring-bolt 44 fixed outwardly on the lower portion of the wall 33, A well-known, receiving energy-controlling, modular, preferably electrical-driven, air compressor (not shown) is provided within the compartment 39, for example, and connected with a number of connection pipes and valves (not shown) to the tanks 28 and the room 35 and being capable of filling the room 35 with air from the tanks 28 to keep a surface of the flow C in an operative position on a plane containing the lower ends of the walls 33 and 34 and the upper portions of the lowermost blades 22 or to displace the water surface within the room 35 down. For controlling the kinetic energy being receiving by the runner 20, the air is displaced by the controlling compressor means into or from the room 35 so that the compressed air urges the surface of the flow C to move in an intended vertical direction in relation to a radial width of the lowermost blade 22 and cause decreasing or increasing correspondingly the pressure of the flow C onto the lowermost members 22.

In operation of the turbine L, the shroud 21 separates the flow A into the flow C in the directions G and B which runs as a fluid jet at increased speed immediately under the edges of the walls 33 and 34 and between the lower portions of the walls 30 and 31 and dynamically presses onto the lowermost blades 22, and into the flow D in the direction H immediately above the roof 32. In known manner, the blades 22 are capable to be submerged in and positioned across the flow C and urged by the flow C to rotate in the direction B and receive the kinetic energy of the flow C while it accelerates as is sucked into a low pressure zone created in the flow A immediately behind the shroud 21 by its abrupt ending that is believed to assist in producing a high efficiency design of the turbine L. The rotation of the hub 23 moves the blades 22 continuously, alternately and in turn between the lower operative position located across the flow C where the pressure is transferred continuously from the blades 22 to the hub 23 which rotates with the blades 22 about the axis in the direction B, and the upper inoperative position within the room 35 which being occupied with air and in which relatively less or no dynamic air pressure is transferred to the runner 20, therefore keeping relatively less or no friction loss of transferring kinetic energy.

The feeding of the air from the tanks 28 into the room 35 that forces the water to move from the room 35 into the flow C and to drop the water surface from the upper portion of the lowermost blade 22, where the lowermost blade 22 is capable to receives the maximal kinetic energy of the flow C, toward the lower edge of the lowermost blade 22 where the lowermost blade 22 is not capable to receive the kinetic energy. The aprons 36 do not let the air to go from the room 35 while the water surface is moving between the upper and lower portions of the lowermost blade 22 and the aprons 36 are dropping from the horizontal positions follow the water surface into the vertical positions where lower edges of the aprons 36 will be immediately below the lower edge of the lowermost blade 22 and capable to dry the lowermost blades 22 and to stop the receiving of the kinetic energy of the flow C and rotation of the runner 20 and to control the dynamic pressure of the flow C on the lowermost blades 22, and to increase a lift force of the shroud 21 in the flow A to facilitate the emersion of the turbine L toward the surface of the flow A.

The removing of the air from the room 35 into the tanks 28 permits to allow the water to come from the flow C upward into and fill up the room 35 to brake rotation of the blades 22 and the runner 20.

The turbines E and L may be conveniently fabricated from metal such as steel and duraluminum or fiberglass.

A choice of an appropriate means for converting kinetic energy of the turbines E and L according to the invention into useful energy depends on local demand in energy and conditions of installation of the apparatus. An energy generator may be built-in the units or located in a surface vessel above the flow A. There are the well-know generators such as a modular electricity generator having a generator stator part and a generator rotor part and (or) a positive displacement fluid pump having a plurality of opposed pump cylinders and corresponding pump pistons or diaphragms connected to a pump crankshaft with means for varying the stroke of the pistons or diaphragms within the cylinders, and speed increasers which may be connected between to the hub 1 of the runner F and the axles 2 of the shroud 3 and between to the hub 23 and the shafts 26 and the compartments 39 of the turbine L and to a number of energy-transferring conduits (not shown) extending to an user of the conversed energy.

It is possible for the apparatus the energy which is produced by the generator that may be carried away by means of cables and fed directly into the energy network or may be supplied to, for example, sea water desalting plants and to desalted water pump stations.

In receiving and conversing kinetic energy from the flow A by the use of the turbine E or L constructed described above, firstly the turbine is assembled nearly to a place of working. The turbine can have intended buoyancy because the tank 12 or 29 can be filled with air or the ballast material and provided with a number of plummets so that an intended condition of equilibrium of the turbine in relation to the water body A occurs. The tanks 12 and 29 can be filled with air and the plummet can be taken off when transporting the turbine to the position of installation. A ship such as a towboat can transport the turbine in a floating condition. As soon as the turbine has reached its intended position of installation the tank 12 or 29 according to the requirements involved, is provided with the ballast plummets and thixotropic mud material such as a clay puddle or mud filler mixed with sand for securing the intended negative buoyancy or inundation of the turbine in the water. The thixotropic mud materials are capable of being flowable to be inserted into the tank and a short time later to become hardened for securing less or no friction resistance to rotation of the runner F or 2 and then again to be liquidized in the tank by means of the vibrator means and become flowable for displacing from the tank away by means of, for example, air being pressured into the tank to secure floating of the unit when it needs to be repaired or transported by float-on way. The turbine can slowly sink to the ground bottom or floor of the flow A into an operative position where the bearing arrangement of the turbine only has to still carry the thrust of the flowing water. Then the turbine being maintained in the operative position by aid of the tethers 14 or 42 and 43 and a well-known means of connections such as an anchor chain or rope extending from the turbine and being secured with its far ends to appropriate objects such as anchors, hold fasts or posts which being located aside and upstream of the turbine and engaged with the ground of a bottom or opposite river banks or belt shores and capable of supporting the tether 14 or 42 and 43 and the turbine in the flow A. In another well-known way of anchoring (not shown) the turbine can be attached to one or two surface vessels connected from upstream by an anchoring rope to any anchor.

To maximize the energy which being converted, a multiplicity of the turbines E or L that can be disposed in the string order and attached individually or in group to chain or rope tethers extending from the turbine in a direction crossing the direction B of the flow A, for example between river banks or belt shores, or in a direction opposite the direction B to anchors being secured on a bottom or floor of the flow A.

Method of using of the turbine according to the invention that is depended from the power output. In the most effective case of installation across the narrowest portion of a marine current, the turbine may be installed below, for example, 20 m of a navigable marine waterway and where a depth of the water body is equal to between 40 and 100 m and the current speed is not less than, for example, 1.0 m/s and a diameter of the turbine runner can be equal to, for example, between 10 and 100 m so that the power output of the apparatus between 120 KW and 3 MW is possible. The natural speed in the marine currents can achieved up to 2.5 m/s and in the turbine can achieved up to 5 m/s, while the amount of output power rises with the third power in relation thereto.

Perspective areas for installations of the turbines according to the invention are, for example of Australia, in narrow and deep rifts between Islands of Thurthday and Prince of Wales within Torres Strait, and between Flinders and Cape Barren Islands of Furneaux Group within Bass Strait, et al., there it is possible to install a plurality of such turbines according to the invention of a diameter up to 100 m having a sum power output of thousand of MW.

The above-mentioned turbine embodiments of the invention can be versatile, cheap to manufacture, low in maintenance requirements, highly reliable and requiring a low degree of skill for installation, servicing and operation.

We claim as our invention:

1. An apparatus for converting kinetic energy of a fluid flow in a fluid basin into any useable energy, the apparatus adapted to be submerged into the flow and maintained within a path of the flow to produce the useable energy and comprising:
   a runner means for receiving the kinetic energy, the runner means being rotatable about a central axis, the axis being in an intended operative position horizontal and across of a direction of the flow;
   a shroud means supporting and guiding the runner means for rotation about the axis runner and a means for controlling the receiving and transferring of the dynamic pressure;
   a means for maintaining the shroud means and the runner means in the position;
   a means for generating the useful energy;
   where the runner means comprising:
   a kinetic energy—transferrer hub member supported by the shroud means for rotation about the axis and adapted to support and guide components of the runner means for rotation about the axis and capable of being engaged with the generating means; and
   a plurality of kinetic energy—receiver blade members distributed around the hub member and extended along and between opposing edges of the hub member and connected to the hub member for pivoting about a connecting axis, the connecting axis being within the hub member and the blade member and parallel to the rotating axis, between working lower positions below of the turning axis and radial in relation to the connecting axis where the blade can receive the dynamic pressure of a lower oncoming flow in a direction remote from the rotating axis and transfer a rotating moment being risen about the axis to the hub member to cause the runner means to rotate with the blade member in the direction, and non-working upper positions above the rotating axis and tangential in relation to the connecting axis, wherein the runner means further comprises a drive means for effecting movement of each of the blade members about the corresponding connecting axis in the finishing radial position in a direction opposite to the direction of the oncoming flow to effect prolongation of applying by the blade member the moment to the hub member.

2. The apparatus according to claim 1, wherein the drive means comprises a plurality of spring members, where each of the spring members that is engaged:
   at its first end to the hub member with the ability to be pivoted freely by the blade member about the connecting axis through an intended acute angle between a pair of controlling limit stops while the blade member being pivoted by the pressure of the oncoming lower flow in the direction about the connecting axis from the tangential position into the starting radial position; and
   at its second end to the blade member with the ability to alternately being deformed by the blade member while the blade member being further pivoted about the connecting axis by the flow pressure in the direction of the flow from e the starting position into the finishing radial position and urging the blade member in the finishing position to pivot about the connecting axis in the opposite direction against the flow so to prolong the applying of turning moment to the hub member.

3. The apparatus according to claim 2, wherein each of the spring members that is shaped into an axially, in relation to the connecting axis, extending torsion rod member.

4. The apparatus according to claim 2, wherein the angle must be equal to about 40°-50°.

5. An apparatus for converting kinetic energy of a fluid flow in a fluid basin into any useable energy, the apparatus comprising:
   a runner means for receiving kinetic energy from the flow, the runner means being rotatable about its central axis, the central rotating axis being generally horizontal and disposed across of a direction of the flow, and having an axial hub member and a plurality of receiver blade members supported radially, in relation to the axis, by the hub member,
   a shroud means having a roof, side walls, a front wall for facing the oncoming flow and a rear wall, relative to the direction, to form a room for accommodation of the runner means, the room has an interior for permitting the runner means to rotate about the axis, and an open bottom permitting the blade members to come downward through the open bottom out of the interior;
   means for maintaining the shroud means and the runner means in working positions in the flow; where
   the roof extending at above and along the length and the width of the runner means;
   the front wall located at ahead, in relation to the direction, of the runner means for facing the oncoming flow, having a lower edge generally being parallel to the axis, and being capable of forming a lower fluid jet of the flow that oncoming at under of the edge in the direction to urge the blade members coming in turn toward below of the edge to be rotated and rotate the hub member about the axis;
   the rear wall located at behind of the runner means and having a lower edge generally being parallel to the axis and capable of approaching to the jet discharging from and rearwardly of the runner means;
   where the edges of the front and rear walls that being on a horizontal plane containing an upper portion of the lowermost blade member,
   the side walls located at aside of side ends of the runner means and having lower edges generally being on a horizontal plane containing a lower edge of the lowermost blade member;
   where an upper portion of the lowermost blade member being on a horizontal plane containing the lower edges of the front and rear walls;
   thereby the blade members are capable to be rotated about the axis between the lower working positions located below the room and upper non-working positions located within the room.

6. The apparatus according to claim 5, wherein the apparatus further comprises a source means of compressed gas, a compressed gas injection pipe extending from the gas source means into an upper portion of the room interior and valve means for controlling movement of the gas out of the room, so that movement of the gas into and out of the room that is urging the fluid to move through the opening in intended vertical directions and displace the surface of the fluid located in the room in the vertical directions relatively to the axis and thereby capable of controlling the rotation.

7. The apparatus according to claim 5, wherein the shroud means comprises a room-closing front apron member and a rear apron member correspondingly located below of the front and rear walls, supported by the walls for pivoting about front and rear connecting axes, the connecting axes being within the edges of the walls and upper edges of the apron members and parallel to the rotating axis, having first and second opposing side end edges, the side end edges being in a close relationship to respective inside faces of the side walls and downward oriented facial portions extending between the apron edges, and being capable of floating on the jet surface, pivoting about the connecting axes between horizontal positions oriented into the room and downward oriented vertical positions, and preventing the gas from outflow out of the room through the opening into outside.

8. The apparatus according to claim 7, wherein each of the apron members that comprises a sealing packing means located outside on the ends of the apron member, engaging on the inside faces of the side walls and capable of closing-off the interior of the room in relation to its exterior and preventing the outflow of the gas out of the room into outside.

9. A method of controlling a conversion of kinetic energy of a fluid flow in a fluid basin into any useable energy, the method utilizing an operating anchor means, a rotatable runner means having blade members and a hub member, a shroud room means having a roof, front wall, rear wall and side walls and a lower end opening downward at the lower portion of the hub member, an anchor means for supporting and guiding the room means in the flow, a means for supporting and guiding the rotatable runner means in the room means, a means for converting a kinetic energy of the runner means into an useful energy, and a means engaging the converting means with the hub member;

the method comprising the steps of:
submerging the room shroud means with the downward oriented end opening into the fluid flow and supporting and guiding by the anchor means;
accommodating, supporting and guiding the runner means in a working position within the room shroud means, and inserting the lower blade members through the opening into a lower flowing jet of the oncoming flow;
engaging the hub member with the converting means.

10. The method according to claim 9 and further utilizing a source means of compressed gas and a compressed gas injection pipe and further comprising the step of:
inserting the injection pipe into the room to jet the compressed gas into the room, thereby forcing the liquid fluid through the opening downward out of the room and lowering a surface of the fluid in the room up to the lower edge of the room for receiving a maximal kinetic energy of the fluid jet.

11. The method according to claim 9 and further utilizing an exhausting valve means and further comprising the step of:
inserting the exhausting valve means into an upper portion of the room roof to let the compressed air out of the room, thereby filling the room with the liquid fluid through the opening and rising the surface of the liquid fluid in the room to the predetermined position to brake the rotation of the runner means.

* * * * *